April 27, 1948.    R. HARDY    2,440,268
ELECTROMAGNETIC WAVE DIRECTION INDICATOR
Filed May 28, 1943    2 Sheets-Sheet 1

INVENTOR
RENÉ HARDY
BY
ATTORNEY

INVENTOR
RENÉ HARDY
BY
ATTORNEY

Patented Apr. 27, 1948

2,440,268

UNITED STATES PATENT OFFICE 2,440,268

ELECTROMAGNETIC WAVE DIRECTION INDICATOR

René Hardy, Lyon, France, assignor to International Standard Electric Corporation, New York, N. Y.

Application May 28, 1943, Serial No. 488,875
In France January 17, 1941

Section 1, Public Law 690, August 8, 1946
Patent expires January 17, 1961

9 Claims. (Cl. 343—118)

The present invention relates to systems for indicating the direction of electromagnetic waves, and particularly to radio direction finding systems that comprise means for eliminating the well known 180° ambiguity in the received indications of direction.

An object of the invention is to provide a radio direction finding system in which the 180° ambiguity of the received signal is automatically eliminated.

According to certain features of the invention, a radio direction finding system which incorporates such features comprises circuits that cause the appearance on an indicator, such as a cathode ray oscillograph, of two indications at 180° from each other, and means for obtaining an extinction of the cathode ray spot during a portion of the scanning sweep in such a manner as to permit unambiguous determination of the direction of the transmitter.

In one embodiment of the invention a radio direction finding system comprises a circuit which generates short voltage pulses, such as a thyratron circuit, and is actuated in synchronism with the rotation of the receiving loop. These pulses are used for blocking the indicator, e. g. a cathode ray oscillograph, during the undesirable period by acting on a circuit that brings into action at this moment the effect of a vertical receiving antenna, so that there is obtained an indication of direction without ambiguity as to the direction of this indication, in the well known manner, as when a vertical antenna effect is added to a reception by a loop aerial or rotating collector.

The invention is explained in detail hereunder in the following description, with reference to the appended drawings, in which.

The indication furnished by a radio direction finder having a simple rotating loop is usually repeated at about 180°, i. e. there are two indications for each rotation of the loop aerials.

Figures 2, 3:
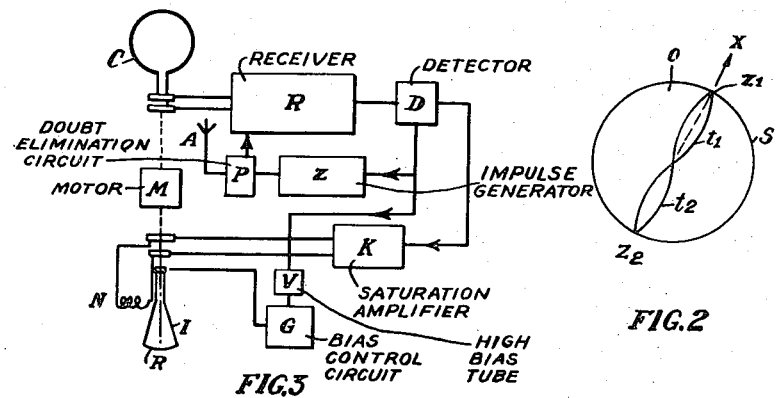
Fig. 2 shows the indication of direction obtained on an indicator, such as a cathode ray oscillograph.
Fig. 3 illustrates schematically a radio direction finding circuit that incorporates certain features of the invention.

The receiver R (Fig. 1) is, for example, connected to a loop aerial C that is driven by a motor M, and the detector circuit D detects the envelope curve of the high frequency current that proceeds from the antenna C rotating in the field of the transmitters. The voltage E that is thus detected has the shape of two half-sinusoids A (Fig. 5) with two maxima and two minima per rotation; the minima correspond to the passage through the "zero" point of the antenna and at this moment the current received is nil. When the loop aerial is well balanced, the two minima nils are staggered by 180°. In order to determine the direction of the source of transmission, the detected voltage is used in a cathode ray indicator, for example, by rotating the luminous spot in synchronism with the loop aerial and by effecting a radial modulation with the detected envelope curve according to well known methods. The spot is not deflected during the two minima and it remains on the circle S (Fig. 2). These are the points $Z_1$, $Z_2$, and during the time $t_1$, $t_2$, the spot is brought back toward the center by making suitable use of the detected current together with a saturated circuit, and it is possible to sharpen the image thus obtained in order to make it more precise. The direction X read on the dial corresponds to an angle formed with the guide mark O. This angle represents the one for which the loop aerial passes through a minimum, but since there are two minima per rotation, it is not known whether the direction of the transmitter is toward $Z_1$ or $Z_2$.

By means of a conventional doubt-elimination circuit it is possible to introduce an antenna current which is superposed on the loop aerial current, and, owing to the fact that when the loop aerial rotates it is at one time in phase and at another time in phase opposition with the antenna current, according to the size of the antenna current, one maximum out of the two will be weaker than the other and the minima will no longer be at 180° from each other. According to the direction of bending of the image, it can be deduced by pre-arrangement whether the actual direction is $Z_1$ or $Z_2$. The elimination of doubt is generally effected by means of a circuit controlled by a key on the receiver, and advantage is taken of a time when the image is suitable to depress the key rapidly for a moment so as to be able to see where the bending takes place.

This method which gives good results has however various drawbacks, particularly in the case of an airplane; if the airplane turns frequently, there is a risk of the operator forgetting which of the two images $Z_1$, $Z_2$ is the one that corresponds to the true direction. He is consequently obliged to manipulate the doubt eliminator; furthermore, when telegraph transmissions or emissions of short duration are received, there is not always sufficient time to manipulate the key rapidly at the moment when the image appears before it vanishes. It would be preferable to be able to suppress one of the two images $Z_1$, $Z_2$ either when the receiver is adjusted, or else permanently.

Figure 1:
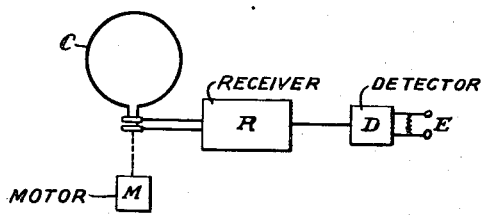
Fig. 1 illustrates very schematically a conventional radio direction finding circuit with rotating loop aerial.

According to certain of its features, the invention accordingly proposes the use of a circuit like the one shown in Fig. 3. In this Fig. 3, the receiver R, as in Fig. 1, is connected to a loop aerial C rotated by a motor M and controls, e. g. over the detector D and saturation amplifier K, a magnetic deflection circuit N which is also driven by the motor M and which rotates around the axis of a cathode ray tube I, on whose screen T the spot describes a circle when there is no signal. For effecting this doubt-elimination, there are provided an antenna A and a doubt-elimination circuit P which maintain the antenna current at a suitable phase and amplitude according to known methods. The circuit P functions only at certain short periods of each cycle of rotation of the loop C, as will be described later, and is connected to the receiver R which during these short periods thus receives the combined signals from the loop C and the antenna A.

For the purpose of causing the disappearance of one of the images $Z_1$, $Z_2$ in order to obtain an indication in direction and lay, certain features of the invention comprise the providing of means for modulating the grid of the cathode ray tube I by applying to this grid for the time $t_2$ a negative potential of such value that the spot becomes extinguished. Accordingly, the circuit G which controls the grid of the cathode ray tube is connected to a circuit V which is controlled by the detected output of the receiver in a manner to be later described.

To cause the circuit P to function for certain short periods of each cycle, this circuit is controlled by a pulse generator Z which is in turn controlled by the output of detector D. The circuit Z may be any suitable circuit that generates brief pulses e. g. in the manner shown in Fig. 4, by means of a triode gas tube TH of the kind known as a thyratron, the plate circuit of which comprises a resistance $\rho$ which serves as an element for generating square or rectangular impulses from the sawtooth discharge of the thyratron. Between the plate and cathode of the tube TH is a condenser $C_0$, which, when the tube TH is shut off, charges at a uniform rate through a constant current pentode tube L. The operation of the tube TH discharges the condenser $C_0$ through the resistance $\rho$, the time constant of this circuit determining the discharge time. The discharge timing of the tube TH may be controlled by the output of the detector.

For example, it is possible by means of the condenser S to synchronize the discharge of the thyratron TH with the detected envelope curve at the outlet of D. The bias on the grid of the thyratron tube TH is adjusted to such a value that the tube will not discharge until approximately the maximum voltage of each half cycle of the detected envelope A of Fig. 5 has been reached. Thus the tube will discharge once every half cycle and for a short period of time depending on the time constant of the condenser $C_0$ and resistance $\rho$. This produces a rectangular shaped pulse on the plate of the tube TH corresponding to each steep portion of the saw-tooth wave produced across the condenser $C_0$.

These pulses are utilized to control the extinction of the spot on the cathode ray tube. In order to do this they are used to control the operation of the double-elimination circuit P by acting, for instance, on a suitable bias tube in the circuit, thus limiting the signals from the antenna A to the receiver R to periods of time corresponding to the pulses from the circuit Z.

The output of the detector D, besides being delivered to the saturated amplifier K, is delivered to the circuit V which controls the bias control circuit G. The circuit V may be a tube normally biased to plate current cut-off. The tube V will conduct only when a positive voltage of a predetermined value is applied to its grid.

The circuit G may be a parallel resistance-capacitance circuit, the condenser of which is charged rapidly during the conducting time of the tube in circuit V and which discharges slowly through the paralleled resistor. The voltage across the condenser acts upon the control grid of the cathode ray tube to drive it negative so as to extinguish the spot. The time constant of this resistance-capacitance combination G is so chosen that the spot is extinguished for at least one half rotation of the loop C.

Figure 4:
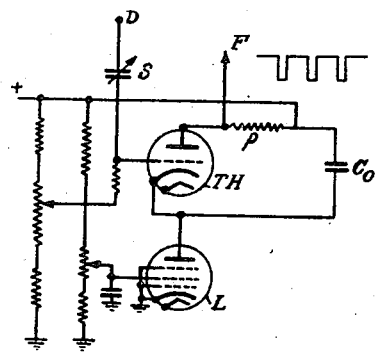
Fig. 4 illustrates an example of a relaxation circuit which can be used in the radio direction finder of Fig. 3.

The relaxation circuit shown in Fig. 4 is well known per se and does not call for further detailed description. It must however be understood that any other conventional connection arrangement may be used and that the tube L which is usually employed for giving a pure sawtooth shape to the thyratron is not indispensible.

The generation of the pulses in the resistance $\rho$ will consequently be strictly synchronized with the rotation of the loop aerial C, since it is the detected envelope curve resulting from the rotation of this loop aerial that controls the discharge of the thyratron. An assembly of this kind may be suitable up to frequencies of the order of 50 kilocycles, beyond which it is known that the thyratron becomes unstable. Besides, there are a great many circuits that can be used for producing brief rectangular impulses that are synchronized with a given electric phenomenon, and a thyratron circuit is of course only described here as an example of a method for effecting a brief contact at approximately the moment at each half-turn when the loop aerial C (Fig. 3) passes through a maximum of reception. It must be understood that, according to one variation, it is possible to synchronize the discharge of the thyratron, not with the detected envelope curve but with the envelope curve that comprises the antenna effect, i. e. to light up the thyratron once per rotation instead of twice.

Figure 5:
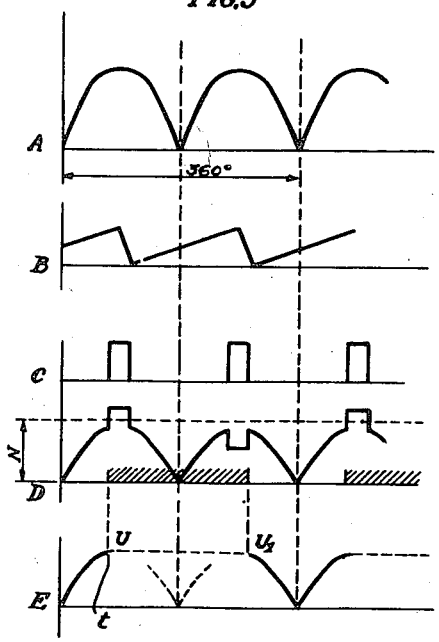
Fig. 5 shows an assembly of curves used to explain the operation of the circuits.

The mode of operation of the circuit of Fig. 3, with use of a circuit like that of Fig. 4 for the circuit Z will be better understood by referring to the various curves of Fig. 5. In Fig. 5, $A_1$ represents the curve of the detected current proceeding from the loop aerial; this curve has maxima and minima every 180°. $B_1$ indicates the sawtooth current proceeding from the thyratron of Fig. 4, this current being synchronized in the above explained manner with the detected signal $A_1$. This triangular shaped current may be suppressed when there is substantially no signal coming from the detector D, or as long as such signal does not attain a certain amplitude. In this way, the thyratron only comes into operation when the loop aerial receives something else besides strays and when there is formation of an envelope curve whose frequency will permit synchronization of the discharge, the thyratron's circuit being arranged so that the time constant of the strays is insufficient to affect its operation. The thyratron TH of the circuit Z is accordingly controlled by the detector D and a brief period of its discharge will be utilized for controlling the extinction of the cathode ray tube during the undesirable period. The series of pulses at the terminals of the resistance $p$ of the circuit are like those shown at $C_1$ in Fig. 5, each rapid discharge of the thyratron when its internal resistance is negligible producing one pulse.

During this discharge period, the thyraton controls the setting into operation of the doubt-eliminating circuit P, as already described, e. g. by unblocking a tube of this circuit, causing it to deliver signals from the antenna A to the receiver R. The envelope curve shown at $A_1$ in Fig. 5 is consequently modified in the manner shown at $D_1$. When the loop aerial passes through a reception maximum, its current is in phase one time out of two, and in phase opposition one time out of two, with the antenna current, and accordingly, during the very short time of discharge of the thyraton, the vertical antenna effect will successively increase and diminish the amplitude of the maxima of the detected envelope curve $A_1$ (Fig. 5) so as to give it the shape $D_1$. During its discharge time, it is evident that the thyraton is blocked and is not subjected to retroaction by its control circuit.

The amplitude N on the curve $D_1$ of Fig. 5 represents the bias voltage on the grid of tube V which is the control circuit for the grid of the cathode ray tube. This tube V is usually biased very negatively and from curve $D_1$ it can be seen that only once per rotation it will receive a voltage impulse that will exceed the cut-off point of its plate current.

The curve $E_1$ shows the portions of the detected curve that act on the cathode ray indicator during the periods when the spot is left illuminated. The circuit G, because of its time constant will apply the extinguishing negative potential to the control grid of the cathode ray tube from time U to time $U_1$.

Figure 6:
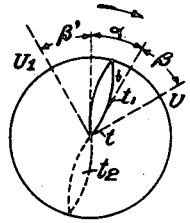
Fig. 6 shows the indication obtained with the circuit of Fig. 4.

In Fig. 6 the angle $\alpha$ represents the time that the spot, for one of its minima, takes to cover the distance from the center to the circle and back again. When the spot has reached the center, rotating in the direction of the arrow, it stays there because the circuit K is saturated until the moment $t$, which corresponds to the angle $\beta$, and at this moment $t$, the above described doubt-elimination circuit enters into action, as shown at $E_1$ (Fig. 5) and extinguishes the image $t_2$ because the spot remains dark from U to $U_1$ (Fig. 6). When there is reception of a signal, each rotation of the loop aerial is consequently accompanied by the production of a synchronized oscillation of the circuit Z which extinguishes the spot over a considerable part of the circumference. The image $t_1$ appears alone on the screen without the 180° uncertainty, and since one pulse out of two will be in phase and the other in opposition, there in certainty that the image which appears is always the one that gives the correct indication.

Figure 7:
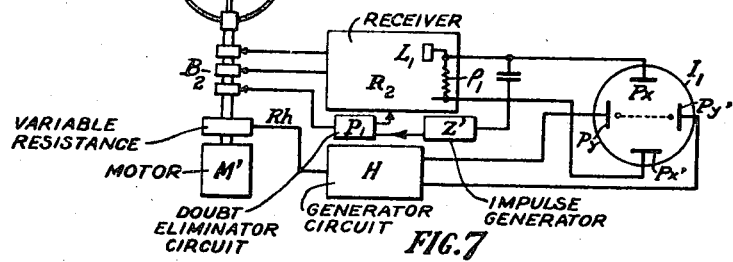
Fig. 7 is a schematic view of another radio direction finding system that incorporates features of the invention.

Another doubt-elimination system for radio direction finders that incorporates features of the invention is shown in Fig. 7. This system is particularly adapted for use on board moving objects such as airplanes owing to its light and space saving construction.

In the schematic illustration of Fig. 7, a loop aerial $C_2$ is driven in rotation by a motor M' which also operates on the same shaft a variable resistance collector $Rh$ or any other known scanning device for cathode ray tubes.

The loop aerial $C_2$ is connected by conductive rings and wiping brushes $B_2$ to the amplifier receiver $R_2$ in which the output tube $L_1$ comprises a resistance $p$ connected to the vertical deflection plates $Px$, $Px'$ of a cathode ray tube indicator $I_1$. The variable resistance collector $Rh$ is connected over a generator circuit H, of which this collector forms part, to the other deflection plates $Py$, $Py'$ of the cathode ray oscillograph.

When there is no signal reception, the cathode spot describes a horizontal line $a$—$b$ (Fig. 8), on the screen of tube $I_1$ owing to the variation of potential of the collector $Rh$.

Figure 8:
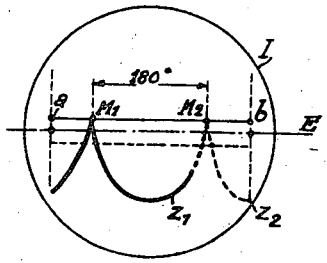
Figs. 8 and 9 show two kinds of indications obtained with the system of Fig. 7, respectively adjusted incorrectly and correctly.
Figure 9:
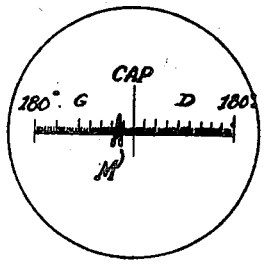

As soon as a signal is received, the detected envelope curve appears with peaks that correspond to the reception minima, and it acts on the plates $Px$, $Px'$ in such a way as to furnish, for example, the image shown in Fig. 8 with two peaks $M_1$ and $M_2$ at 180° from each other.

According to certain features of the invention, the illumination of the cathode ray spot may be cut off for the time $Z_1$, $Z_2$ (Fig. 8) so as to show one only at two peaks. This effect can be obtained in a simple manner by means of a circuit like the one shown in Fig. 4 inserted at the outlet of the receiver $R_2$.

Thus, the circuit Z', similar to the circuit Z of Fig. 3 may be connected to the plate of the tube $L_1$ in any desired manner and supplies a doubt-elimination circuit $P_1$ with controlling pulses synchronized with the rotation of the loop $C_2$. The circuit $P_1$ is connected to the vertical antenna $A_2$ and supplies the receiver $R_2$ with the constant signal from the transmitter during the periods of the pulses in the same manner as explained in connection with Fig. 3.

It must be understood that the linear scanning may be obtained otherwise than by a collector keyed on the shaft of the motor M'.

The screen of the cathode ray tube may be provided with a graduated scale that will comprise in the center an indication of the course of the airplane and on each side graduated scales of the lay up to 180° on the right and 180° on the left. This graduated scale may be carried on the cathode ray tube screen itself or else on a transparent slide. In both cases, an adjustment of the zero mark can be made by means of an element that acts on the resting position of the cathode spot in the first case, or a mechanical member that displaces the transparent slide in the second case.

If desired, it is also possible to suppress the illumination of the cathode ray spot for an amplitude greater than $E_1$ (Fig. 2) so as to allow only the peak $M_1$ (Fig. 8) to appear. This may be done in any known way, e. g. by modulating the grid of the cathode ray tube for this purpose.

It is evident that in the various examples of embodiments shown and described, use may be made of stationary aerials and a mechanically or electrically rotating finder instead of the rotating loop aerial shown in the drawings. Furthermore, a description has only been given of those portions of the systems that are necessary for understanding the invention.

It must be understood that the invention is not limited to the examples of embodiments shown and described, but that on the contrary it is capable of numerous modifications and adaptations without departing from its scope.

I claim:

1. A radio direction finder comprising a directional antenna, means to rotate the directivity of said antenna, means to receive a signal from said antenna, means to detect said signal, means to produce pulses from portions of said detected signal having a value above a predetermined value, a second antenna adapted to intercept signals from any direction, means controlled by said pulses to feed said last mentioned signals into said receiving means during the periods of said pulses only, a cathode ray tube, means to control the spot of said tube in one coordinate of a two coordinate system with the rotation of said antenna directivity, means to control said spot in the other coordinate by the output of said detecting means, and means to extinguish the spot of said cathode ray tube for a predetermined period of time when the output of said detecting means rises above a predetermined value.

2. A radio direction finder in accordance with claim 1, in which the spot extinguishing means includes a time constant circuit arranged to maintain the extinguishment of said spot for substantially a half rotation of said antenna directivity.

3. A radio direction finder in accordance with claim 1, in which the spot of the cathode ray tube is controlled in polar coordinates.

4. A radio direction finder in accordance with claim 1, in which the means to control the spot of the cathode ray tube in one coordinate comprises a coil which is moved around the neck of the tube in synchronism with the rotation of the antenna directivity.

5. A radio direction finder comprising a directional antenna, means to rotate the directivity of said antenna, a receiver including selector and amplifier circuits connected to said antenna, a detector connected to said receiver for detecting the low frequency envelope output of said receiver, a pulse generating circuit connected to the output of said detector and adapted to produce pulses in synchronism with the peaks of the detected envelope, an omnidirectional antenna, means controlled by said pulses to connect said omnidirectional antenna to said receiver during the periods of said pulses, whereby alternate half cycles of the detector output are provided with increased voltage peaks, an indicating device arranged for indication in two coordinates, means to control one of the coordinates of indication by the rotation of said directional antenna, means to control the other coordinate of indication by the output of said detector, and means to cause said voltage peaks to block out said indication for a portion of the cycle of rotation of said directional antenna.

6. A radio direction finder in accordance with claim 5, in which the means to block out the indication for a portion of the cycle of rotation comprises a time constant circuit controlled by said voltage peaks with a time constant sufficient to block out said indication for substantially one half rotation of the directivity of said directional antenna.

7. A radio direction finder comprising a directional antenna, means to rotate the directivity of said antenna, a receiver including selector and amplifier circuits connected to said directional antenna, a detector connected to said receiver for detecting the low frequency envelope of the output of said receiver, a pulse generating circuit connected to the output of said detector and adapted to produce pulses in synchronism with the peaks of the detected envelope, an omnidirectional antenna, means controlled by said pulses to connect said omnidirectional antenna to the input of said receiver during the periods of said pulses, whereby alternate half cycles of the detector output are provided with increased voltage peaks, a cathode ray tube, means to control the spot of said tube in one coordinate of a two coordinate system with the rotation of said antenna directivity, means to control said spot in the other coordinate by the output of said detector, and means to extinguish said spot when the output of said detecting means rises above a predetermined value and to maintain it extinguished for substantially a half rotation of said antenna directivity.

8. A radio direction finder in accordance with claim 7, in which the means to control the spot in the one coordinate comprises a coil which is rotatably mounted around the neck of the cathode ray tube and rotates in synchronism with the directivity of the directional antenna.

9. A radio direction finder in accordance with claim 7, in which the means to control the spot of the cathode ray tube in one coordinate comprises a variable resistor arranged to vary with the rotation of the directivity of said directional antenna connected to one set of deflection elements of the cathode ray tube and the means to control the spot in the other coordinate comprises a connection between the other set of deflection elements of the cathode ray tube and the detector.

RENÉ HARDY.

REFERENCES CITED

The following references are of record in the file of this patent:

UNITED STATES PATENTS

| Number | Name | Date |
|---|---|---|
| 2,263,377 | Busignies | Nov. 18, 1941 |
| 2,279,466 | Johnske et al. | Apr. 14, 1942 |
| 2,320,908 | Busignies | June 1, 1943 |
| 2,388,262 | Ganiayre et al. | Nov. 6, 1945 |